(No Model.)

A. E. BUTTERFIELD.
EYEGLASSES OR SPECTACLES.

No. 550,864. Patented Dec. 3, 1895.

WITNESSES:
Paul Johst
Fred. Acker

INVENTOR
A. E. Butterfield
BY
Munn & Co
ATTORNEYS.

UNITED STATES PATENT OFFICE.

ALBERT EUGENE BUTTERFIELD, OF PORTLAND, OREGON.

EYEGLASSES OR SPECTACLES.

SPECIFICATION forming part of Letters Patent No. 550,864, dated December 3, 1895.

Application filed March 26, 1895. Serial No. 543,229. (No model.)

*To all whom it may concern:*

Be it known that I, ALBERT EUGENE BUTTERFIELD, of Portland, in the county of Multnomah and State of Oregon, have invented a new and useful Improvement in Eyeglasses or Spectacles, of which the following is a full, clear, and exact description.

My invention relates to an improvement in bifocal glasses; and it has for its object to provide a means whereby a full-sized lens may be used in spectacles or eyeglasses for distant vision and whereby other lenses will be so attached to the distance-lenses that they may be brought over the same, rendering the same glasses fitted for near work or reading and whereby when the glasses are to be used for distant vision the auxiliary glasses may be carried entirely out of the way.

A further object of the invention is to so construct and connect the auxiliary with the main glasses or lenses that they may be adjusted without necessitating the removal of the glasses or spectacles from the nose of the wearer.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
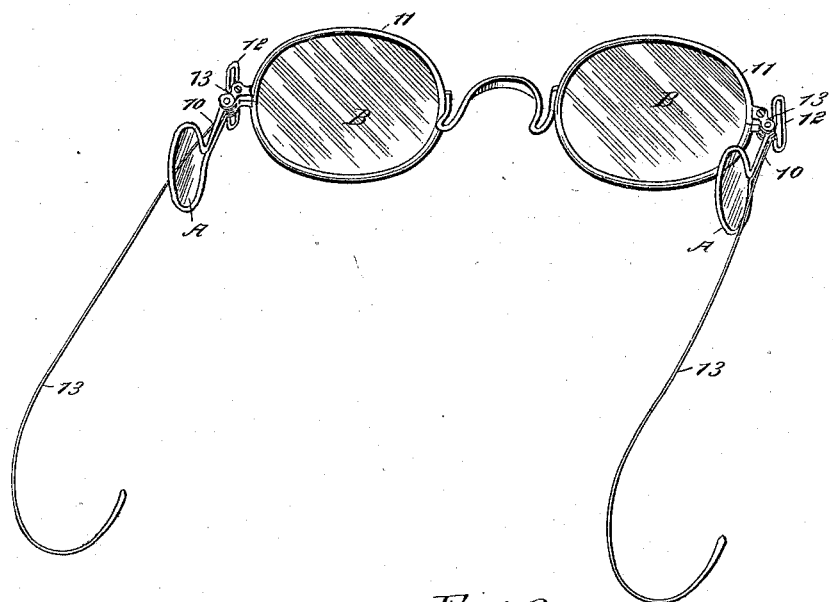
Figure 2:
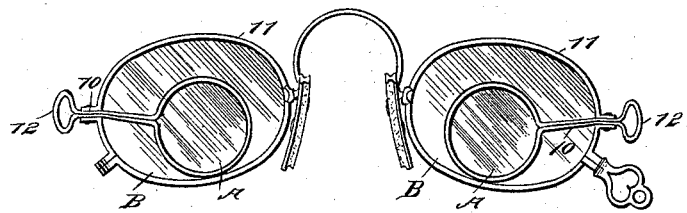
Figure 3:
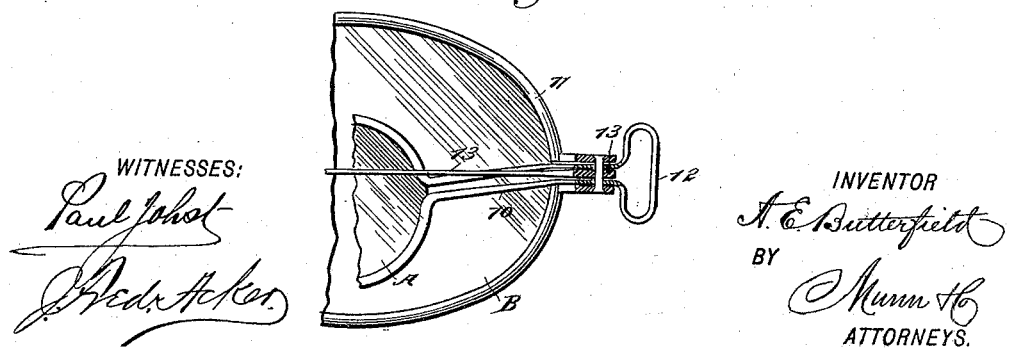

Figure 1 is a perspective view of a pair of spectacles having the bifocal attachment applied and showing the bifocal attachment out of use with relation to the lens of the spectacles. Fig. 2 is a front elevation of a pair of eyeglasses having the bifocal attachment applied, in which the auxiliary lenses are brought in range with the main lenses, whereby the two are used together; and Fig. 3 is an enlarged view of the temple end of a pair of spectacles, illustrating the manner in which the ear-pieces and the auxiliary lenses are connected with the main lenses.

In carrying out the invention an auxiliary lens A is pivotally connected with the temple end of each main lens B of a pair of spectacles or eyeglasses. The auxiliary lenses A are usually mounted in a frame of any desired shape, the said frame being provided with a shank 10, and the said shank is pivotally connected with the frame 11 of the glasses when a frame is employed, or directly to the main lens when the lenses are rimless. The shank of each auxiliary lens is provided at one of its extremities with a handle or extension 12 and is pivoted to the main lens adjacent to the handle, the handle extending outward beyond the pivot-point, and when ear-pieces 13 are used in connection with the lenses the pivot-point for the said ear-pieces and the shanks of the auxiliary lenses may be and usually are the same as shown in Figs. 1 and 3.

The shanks of the lens-frames A are each preferably formed of two members, the extremities of which are formed into a loop, as shown, forming the handle 12.

By carrying the handle end of the auxiliary lenses A in direction of the face or inwardly the auxiliary lenses will be carried over to an engagement with the inner side faces of the main lenses with which they are connected, as shown in Fig. 2, and supposing the main lenses to be full-sized lenses for distant vision when the bifocal or auxiliary lenses are used in connection with them the same glasses may be handily used for near work or for reading, or the auxiliary lenses A may be simply a colored lens, if necessary.

When the auxiliary lenses are not in use, they stand preferably at a right angle to the temple ends of the main lenses, as shown in Fig. 1, facing the wearer, and will therefore lie along the temples of the wearer and in no manner inconvenience the latter, the outward movement of the said auxiliary lenses being limited by the handles or extensions 12 coming in contact with the frame of the glasses. It is likewise evident that the glasses need not be entirely removed from the nose to effect a change of lenses, and that the additional lenses will add but little to the expense of manufacture. It will also be understood that the auxiliary lenses may be rimless, if desired, in which event the shanks will be suitably fastened directly in the lenses.

Having thus described my invention, I claim as new and desire to secure by Letters Patent—

1. In bifocal glasses, auxiliary or bifocal lenses pivotally attached to the temple ends of the main lenses of an eye-glass or a pair of spectacles, the said bifocal or auxiliary lenses being provided with shanks by means of which they are pivoted, the said shanks being provided with outward extensions or handles beyond their pivots, the said bifocal lenses being adapted to fold over upon the main lenses or outward at an angle thereto, substantially as described.

2. The combination with a pair of glasses, of auxiliary lenses mounted in frames provided with shanks formed of two members pivoted to the main lens frame and provided with loops projecting beyond the pivots and forming handles by which the auxiliary lenses are manipulated, substantially as described.

3. The combination with a lens frame, of auxiliary lens frames provided with shanks formed of two members pivoted to the main lens frame and formed with loops beyond the pivots forming handles, and ear pieces pivoted to the main lens frame between the members of the shanks of the auxiliary lens frames, substantially as herein shown and described.

ALBERT EUGENE BUTTERFIELD.

Witnesses:
ALBERT H. TANNER,
HARRY C. ROBERTSON.